United States Patent
Allen

(10) Patent No.: US 8,259,820 B2
(45) Date of Patent: Sep. 4, 2012

(54) METHOD FOR LOW POWER COMMUNICATION ENCODING

(75) Inventor: Brian Allen, Grant, FL (US)

(73) Assignee: Texas Instruments Incorporated, Dallas, TX (US)

(*) Notice: Subject to any disclaimer, the term of this patent is extended or adjusted under 35 U.S.C. 154(b) by 1115 days.

(21) Appl. No.: 12/140,167

(22) Filed: Jun. 16, 2008

(65) Prior Publication Data

US 2009/0310657 A1    Dec. 17, 2009

(51) Int. Cl.
*H04L 27/04* (2006.01)
*H04L 25/00* (2006.01)
(52) U.S. Cl. .................... 375/256; 375/259; 375/377
(58) Field of Classification Search .............. 375/219, 375/256–259, 295, 316; 326/115, 127
See application file for complete search history.

(56) References Cited

U.S. PATENT DOCUMENTS

| | | | | |
|---|---|---|---|---|
| 4,745,305 A | * | 5/1988 | Crafts | 326/86 |
| 6,218,863 B1 | * | 4/2001 | Hsu et al. | 326/87 |
| 2009/0013116 A1 | * | 1/2009 | Svanell et al. | 710/118 |

* cited by examiner

*Primary Examiner* — Lawrence B Williams
(74) *Attorney, Agent, or Firm* — John J. Patti; Wade J. Brady, III; Frederick J. Telecky, Jr.

(57) ABSTRACT

A low power communication encoding method is provided. A first piece of encoded information and a second piece of encoded information are generated based on a comparison of a current transmission record and a previous transmission record. Then transmission data is selected based on which of the first and second pieces of encoded information will result in transmitting a fewer number of logical lows. Ultimately, the transmission data is transmitted on an open drain data line.

14 Claims, 2 Drawing Sheets

METHOD FOR LOW POWER COMMUNICATION ENCODING

BACKGROUND

1. Field

The present invention relates generally to communication encoding and, more particularly, to communication encoding within a bidirectional system.

2. Description of Related Art

There are systems that provide bidirectional communication between multiple devices similar to that depicted in FIG. 1. Such systems usually employ an open drain configuration which allows multiple devices to be connected to the same data line. Thus, multiple devices can drive information onto the single data line. In this arrangement, whenever a device drives a logical low onto the data line, current is consumed at a rate of $V_{SUPPLY}/(R_{PULL-UP}+R_{OPEN\,DRAIN})$. Whenever transmitting a logical one, the open drain device is turned off and very little power is used. However, for low power systems, the resulting communication current can exceed the capability of the system if a number of consecutive logic lows are transmitted on the data line.

One attempt to address this excessive current that is used during the transmission of consecutive logic lows involves using unidirectional lines between each of the multiple devices. However, in this solution, the number of lines increases proportional to the number of devices.

Accordingly, there remains a need for a technique that encodes information in a way that reduces the amount of current consumed while retaining the benefits of a bidirectional open drain communication system.

BRIEF SUMMARY

Embodiments of the present invention relate to a method of low power communication encoding. In accordance with this method a first piece of encoded information and a second piece of encoded information are generated based on a comparison of a current transmission record and a previous transmission record, then transmission data is selected based on which of the first and second pieces of encoded information will result in transmitting a fewer number of logical lows. Ultimately, the transmission data is transmitted on an open drain data line.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of embodiments of the invention are illustrated by way of example, and not by way of limitation, in the accompanying drawings, wherein.

DETAILED DESCRIPTION

Figure 1:
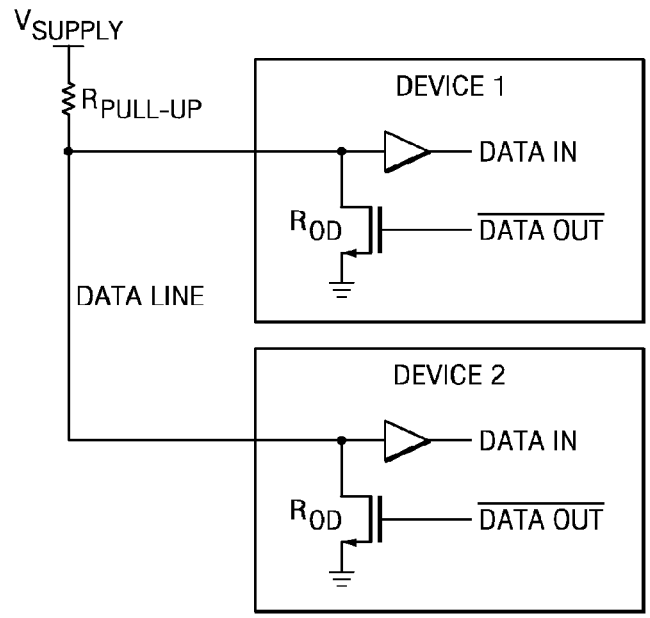
FIG. 1 depicts one approach to a bidirectional open drain communication system.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Embodiments described herein employ techniques for reducing the current consumed in a bidirectional open drain communication system by keeping record of the value of the last transmission of data out. In the figures that follow, few specific details regarding the types of devices that can communicate using such a data line are provided. This is because a variety of such devices exist and can be connected to any of a variety of controllers or microprocessors and have various address lines, timing signals and control signals to control the reading or writing of data. Embodiments of the present invention relate to the determination of what data to transmit on the data line and, therefore, other extraneous components (which may vary greatly) are not described so as not to obscure the inventive aspects herein. Embodiments herein also include aspects of receiving such encoded data and correctly deciphering it.

In at least one embodiment, whenever new data is to be transmitted on the data line, the previous transmission record is compared with the current value to create two pieces of encoded data. The first piece of encoded data contains the number of bit locations that has changed value since the last transmission. The second piece of encoded information contains the number of bit locations that has not changed value since the last transmission. One of ordinary skill will recognize that a data transmission record can vary in size without departing from the scope of the present invention. However, in certain specific examples provided herein a record size of either 4-bits or 8-bits is discussed but this is merely to provide concrete examples and is not intended to be a limitation.

From these two pieces of encoded information, a determination is made regarding what information to transmit. Based on the analysis of the encoded information, the piece with the least amount of logic lows is used for transmission. Transmitting that piece of encoded information will require less power than transmitting the other piece. If the two pieces of encoded information have an equal number of logical lows, then either can be arbitrarily selected for transmission as each will result in the same power consumption.

One of ordinary skill will recognize that there are a variety of ways to determine which bits have changed between the two transmission records and which bits have not changed. Furthermore, there are different techniques available to determine the number of logical lows and highs in the encoded information. However, the figures and their description provide one exemplary technique to provide low power communication encoding in accordance with the principles of the present invention.

When encoded information is transmitted from one device to another, the receiving device requires knowledge of the encoding scheme or technique used to encode the original data. Thus, in the circuitry described below, there is included some method for the transmitting device to also indicate the nature of the encoded information (e.g., whether it is the bits that did not change or the bits that did change). There are a number of functionally equivalent methods to inform the receiving devices of the nature of the encoded information. For example, of the n-bits transmitted in a record, one of the bits could be dedicated to indicating the encoded information. This bit could have one value for one type of encoded information or a second value for the second type of encoded information. Alternatively, the address identified by the receiving device for storing the received data may vary depending on the encoded information. Another possible technique is to have a periodic parity-type byte that instructs how blocks of the encoded information are to be decoded by the receiver. Regardless of the specific techniques used, the transmitter provides along with the encoded information an indication of how the encoded information is to be interpreted while at the receiving device, the encoded information is decoded using this indication.

Figure 2:
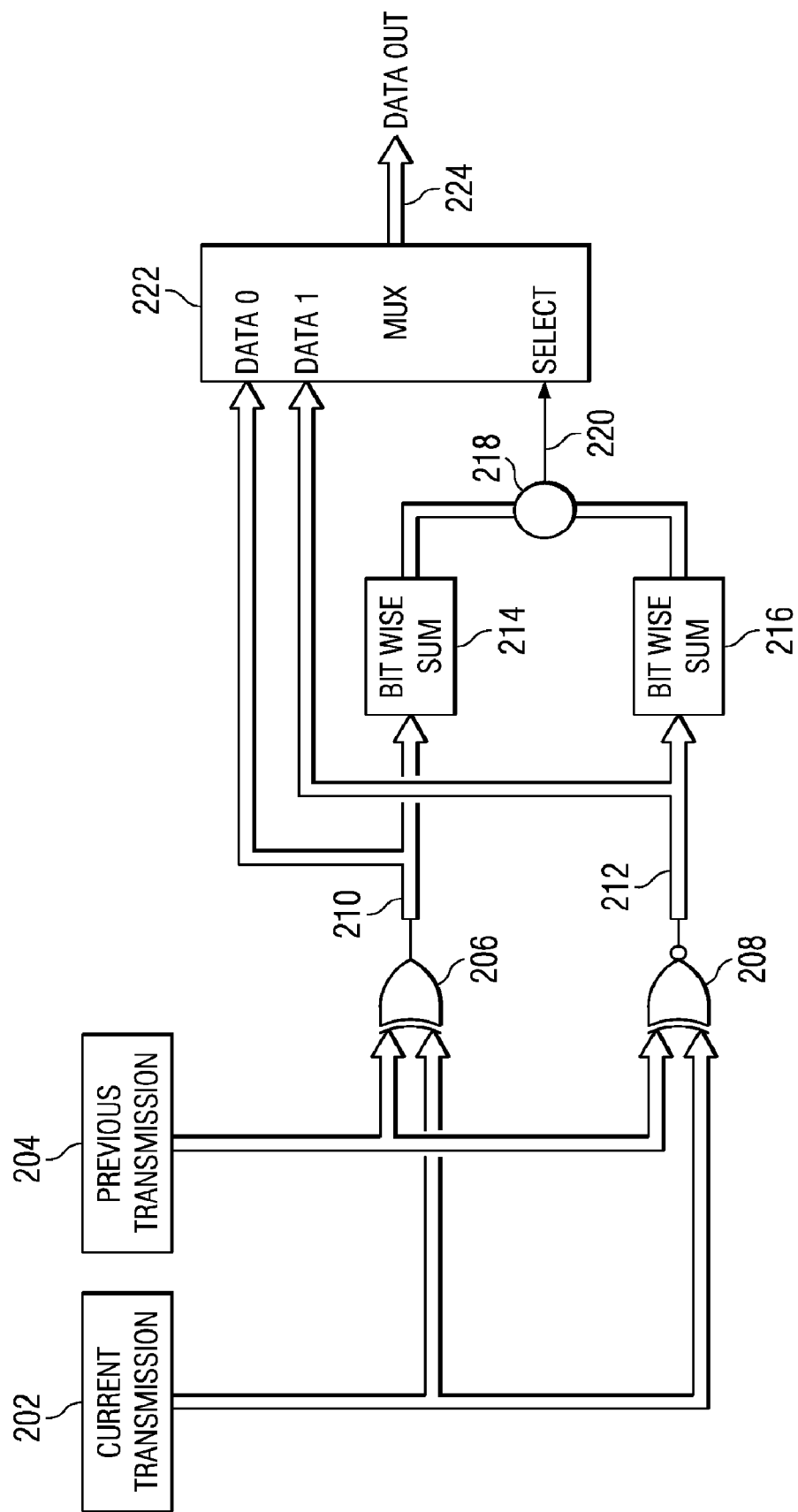
FIG. 2 depicts exemplary circuitry for transmitting low power communication encoded data.

The device of FIG. 2 includes a current transmission record 202 and a previous transmission record 204. These records may, for example, be stored in a register or similar memory. If 8 bits is generally transmitted serially over the open drain data line, then the transmission records will likely be 8 bits in length. However, as mentioned above, one bit may be dedicated to sending an indicator about the encoded information. In this instance, the transmission records may be 7 bit (i.e., one bit less) in length. The transmission records are provided to both an XOR circuit 26 and a not-XOR circuit 208. The XOR circuit 206 will produce an encoded information 210 that indicates the bits which have changed between the previous transmission record and the current transmission record. The not-XOR circuit 208 will produce an encoded information 212 that indicates which bits have not changed between the current transmission record and the previous transmission record.

These encoded information pieces 210, 212 are respectively fed to bit wise summation circuits 214 and 216. The summation circuit will bit wise add the 1's and 0's to generate signals that are compared by comparator 218. The comparator produces an output (i.e., 0 or 1) depending on which bit-wise summation is greater. In other words, this output 220 indicates which encoded information piece includes the most logical 1's. Thus, the output signal 220 can be used as a SELECT signal in multiplexer 222 to select one of the encoded information pieces for transmission as data out 224 to the open drain data line (see FIG. 1 for exemplary DATA OUT circuitry).

Figure 3:
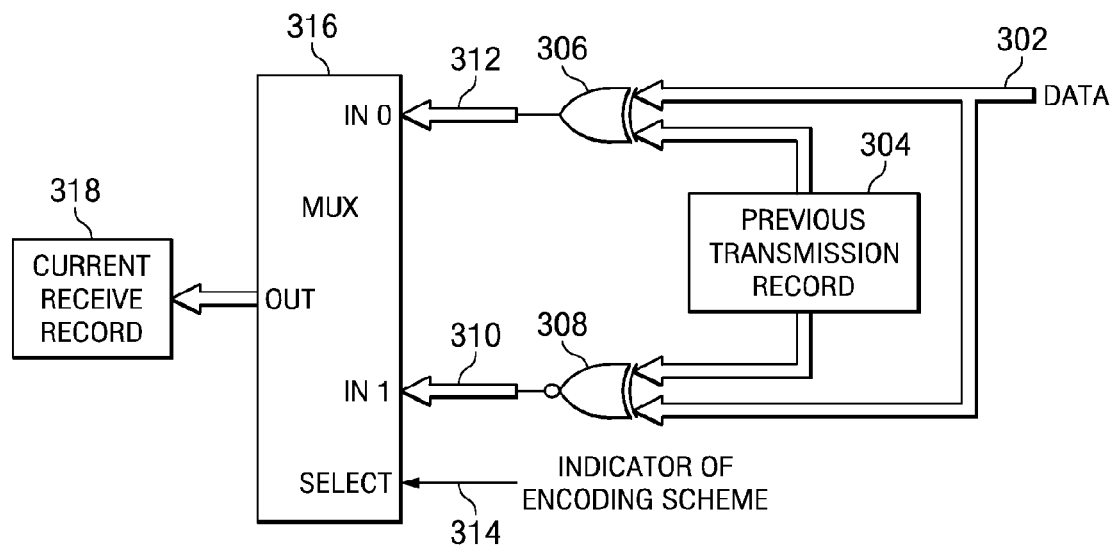
FIG. 3 depicts exemplary circuitry for receiving low power communication encoded data.

FIG. 3 depicts receiving circuitry for a device that communicates on an open drain data line in accordance with the principles of the present invention. The data in 302 is encoded transmission data from another device that is received from the open drain data line and fed to an XOR circuit 306 and a not-XOR circuit 308. The other input to each of these circuits is the previously received transmission record that is locally stored. The XOR circuit 306 produces an output 312 of those bits that are different between the encoded information 302 and the previous transmission record 304. The not-XOR circuit 308 produces an output 310 that indicates those bits that have changed between the previous received transmission record 304 and the encoded data 302.

As mentioned earlier, an indicator 314 is provided that indicates which encoding scheme was used for the encoded data. One value of this indicator indicates that the encoded data is the bits that have not changed from a previous transmission and the other value indicates that the encoded information is the bits that have changed from the previous transmission. This indicator 314 may be derived from the encoded information 302 itself or provided as an out-of-band signal as well.

The indicator is provided to the demultiplexer 316 to select the appropriate signal, either 310 or 312. It is this signal which the demultiplexer provides as the current received record 318. This record 318 can then be acted upon by other aspects of the device which may store the data or otherwise manipulate the data.

The following table illustrates an example of the described circuitry in operation. In general, for 4-bit data transmissions, a 37.5% power savings is realized and for 8-bit data transmissions, a 27.34% power reduction is realized. If the indicator signal is included as one of the bits of the transmitted data, then this encoding method reduces 4-bit data transmission power by 30% and 8-bit data transmission power by 24.3%.

| Current Record | Previous Record | Bits Changed Encoding | Bits Not Changed Encoding | Encoded Data for Transmission | Power Reduction |
|---|---|---|---|---|---|
| 11101011 | 01000100 | 10101111 | 01010000 | 10101111 | 0 |
| 00010011 | 00010001 | 00000010 | 11111101 | 11111101 | 80% |
| 01010110 | 10111000 | 11101110 | 00010001 | 11101110 | 50% |

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. Also, the term "exemplary" is meant to indicate that some information is being provided as an example only as is not intended to mean that that information is somehow special or preferred. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of low power communication encoding, the method comprising the steps of:
    generating a first piece of encoded information and a second piece of encoded information based on a comparison of a current transmission record and a previous transmission record;
    selecting transmission data based on which of the first and second pieces of encoded information will result in transmitting a fewer number of logical lows; and
    transmitting the transmission data on an open drain data line.

2. The method of claim 1, wherein the open drain data line provides bidirectional communication between a plurality of devices.

3. The method of claim 1, wherein the first piece of encoded information indicates which bits have changed between the previous and current transmission records.

4. The method of claim 3, wherein the second piece of encoded information indicates which bits have not changed between the previous and current transmission records.

5. The method of claim 1, further comprising the step of:
   transmitting an indicator of whether the first or the second piece of encoded information is selected as the transmission data.

6. The method of claim 5, wherein the indicator is included as one of the bits of the transmission data.

7. An apparatus for low power communication encoding, the apparatus comprising:
   a transmitter coupled to an open drain data line;
   a first memory configured to store a current transmission record;
   a second memory configured to store a previous transmission record;
   a data encoding circuit configured to generate a first encoded information and a second encoded information based on the current transmission record and the previous transmission record; and
   a transmission data selecting circuit configured to select transmission data from the first encoded information and the second encoded information based on which will result in transmission of the fewest logical lows.

8. The apparatus of claim 7, wherein the data encoding circuit includes:
   a first circuit configured to generate the first encoded information by determining which bits are different between the previous transmission record and the current transmission record; and
   a second circuit configured to generate the second encoded information by determining which bits are the same between the previous transmission record and the current transmission record.

9. The apparatus of claim 8 wherein:
   the first encoded information is bit-wise summed to determine a first number of logical lows;
   the second encoded information is bit-wise summed to determine a second number of logical lows; and
   the transmission data selecting circuit is configured to select the transmission data based on the first and second number of logical lows.

10. The apparatus of claim 7, wherein the apparatus further comprises:
    a receiver coupled to the open drain data line configured to receive data;
    an input configured to receive an encoding indicator;
    a data selection circuit configured to receive first encoded information and second encoded information so as to select a current received record based on the encoding indicator.

11. The apparatus of claim 10, wherein the apparatus further comprises:
    a first encoding circuit configured to generate the first encoded information based on which bits changed between a previously received transmission record and the data; and
    a second encoding circuit configured to generate the second encoded information based on which bits have not changed between the previously received transmission record and the data.

12. The apparatus of claim 10, wherein the encoding indicator indicates which of the first and second encoded information contains less logical lows.

13. The apparatus of claim 7, wherein the first memory is a register.

14. The apparatus of claim 7, wherein the second memory is a register.

* * * * *